Feb. 28, 1928.

F. C. SHEPLEY

SPRING

Filed April 2, 1926

Frank C. Shepley
INVENTOR

BY Victor J. Evans
ATTORNEY

WITNESS:

Patented Feb. 28, 1928.

1,660,892

UNITED STATES PATENT OFFICE.

FRANK C. SHEPLEY, OF HOMINY, OKLAHOMA.

SPRING.

Application filed April 2, 1926. Serial No. 99,334.

This invention relates to certain novel improvements in springs and more especially to a spring adapted for association with a vehicle and has for its principal object the provision of an improved construction of this character which will be highly efficient in use and economical in manufacture.

The present invention contemplates a spring of this character which can be secured directly to integral hangers on a chassis of a vehicle thereby eliminating the necessity of spring perches and lubricating accessories therefor and the ordinary spring shackles now in use.

To accomplish this and other objects of the invention it is intended that the spring proper include as a part thereof a severed spring leaf arranged between certain of the reinforcing spring leaves making up the spring proper whereby these leaf sections provided by severing this spring leaf are capable of relative movement to absorb the shock. By the provision of a spring thus constructed the spring proper, as here indicated, can be connected to integral hangers included as a part of a chassis of a vehicle without depreciating the utility of the spring or deteriorating its absorbing function.

Other objects will appear hereinafter.

The invention consists in the combination and arrangement of parts hereinafter described and claimed.

Figure 1:
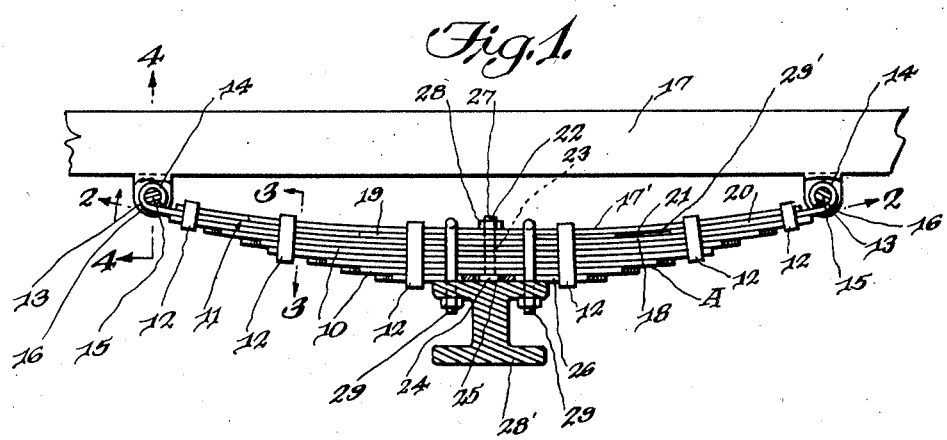
Figure 2:
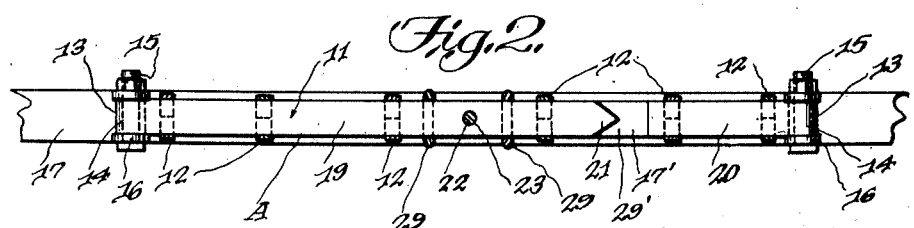
Figure 3:
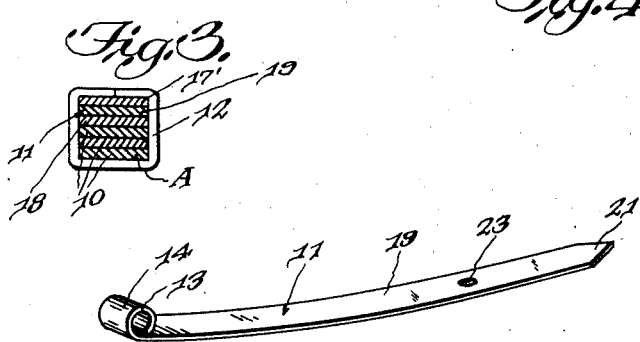
Figure 4:
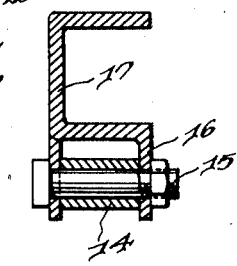
Figure 5:
Figure 6:

The invention will be best understood by reference to the accompanying drawing, illustrating the preferred form of construction, and in which Fig. 1 is a side elevational view of the spring, embodying the invention, showing the same associated with a chassis of a vehicle, said chassis being fragmentarily illustrated, Fig. 2 is a sectional detail view of the same taken substantially on line 2—2 of Fig. 1, Fig. 3 is a sectional detail view of the same taken substantially on line 3—3 of Fig. 1, Fig. 4 is a sectional detail view taken substantially on line 4—4 of Fig. 1, and Figs. 5 and 6 are perspective views of the sections of the main hanger spring embodied in the invention.

It is a known fact to those skilled in the art, that the ordinary half elliptical spring which is connected to spring perches of a vehicle through the medium of hangers, that when the spring acts to absorb a shock the spring leaves tend to move toward flattened condition. In moving toward this flattened condition the hangers are pivoted about their pivotal connection to the perches and transmit the bulk of the shock to these perches. Now should the shock be of a degree above that which the spring can absorb it is obvious that the hangers being limited in their pivotal movement subject the perches to undue strain when the hangers move to their extreme pivotal position by reason of the tendency of the spring to move toward flattened condition. If the shock is not completely absorbed by the time these hangers move to their extreme pivotal position it is apparent that the burden of further resisting the shock is cast upon either the spring leaves making up the spring or the perches. It is manifest that the perches will not tend to absorb the shock because if the shock is too great these perches will be ruptured from the chassis. It is likewise manifest that if the burden is cast upon the spring leaves to further cushion the shock that these spring leaves will tend to buckle. This constant buckling of the spring leaves renders the spring to a condition commonly spoken of by those skilled in the art as a set spring void of further utility as an absorber. It is, therefore, one of the main objects of this invention to provide a spring which will eliminate this buckling and wherein the spring will tend to absorb the shock by frictional engagement between certain of the spring leaves making up the spring proper.

To accomplish this and other objects of the invention I provide a spring, indicated generally at A. This spring includes a plurality of reinforcing spring leaves 10 formed of such material as will best serve the purpose. These spring leaves are connected to a main hanger spring 11 through the medium of clips 12. These spring clips are, in the present instance, welded to the upper spring leaf 17' to serve in their principal capacity to prevent lateral displacement of the spring leaves making up the spring proper.

The hanger spring, herein mentioned, has its opposite end portions 13 curled to provide bearing sleeve 14. These bearing sleeves 14 receive the hanger pins 15 included as a part of hangers 16. These hangers 16 are preferably formed as an integral part of the chassis 17 as illustrated in Fig. 4, however if found necessary these hangers can be made separate from the chassis and welded thereto in a known manner.

As illustrated in Figs. 5 and 6 of the drawing the main hanger spring 11 is disposed between the upper spring leaf 17' and an intermediate spring leaf 18. This main hanger spring is formed in sectional parts 19 and 20, as best illustrated in Figs. 5 and 6, said sectional parts being of different lengths for reasons hereinafter understood. The sectional part 19 has its end portion pointed as at 21 for reasons hereinafter set forth.

In assembling the spring A the main hanger spring sectional parts are arranged in alignment with respect to each other with adjacent end portions in spaced relation between the spring leaves 17' and 18. In this condition a bolt 22 is passed through aligned openings 23 formed in the reinforcing spring leaves and in the leaf section 19. It will be noted that the leaf section 20 is free for longitudinal movement between the adjacent spring leaves 17' and 18 as best illustrated in Fig. 1 of the drawing and that lateral displacement of this leaf section is prevented by certain of the clips 12.

A head 24 at one end of the bolt 22 is confined in an opening 25 formed in the lowermost spring leaf 26 of the reinforcing spring leaves 10. The opposite end of the bolts is threaded as at 27 to receive a lock nut 28 for cooperating with the bolt 22 to bind the spring leaves making up the spring A together.

The spring thus assembled is secured to the axle 28' of a vehicle (not shown) through the medium of U-bolts 29.

In actual use it is important to note that when a sudden shock is transmitted to the axle the spring leaves tend to absorb this shock and in absorbing the shock it is apparent that the spring will tend to move toward flattened condition. In moving toward flattened condition the leaf section 20 will move relatively of the leaf section 19 thus relieving the hangers 16 of a great degree of shock as it is known that the bulk of the shock is absorbed by the reinforcing spring before transmitted to the hanger spring. As this leaf section 20 is disposed between the leaf sections 17' and 18 when this leaf section moves toward the leaf section 19 a frictional condition will exist between the leaf section 20 and the adjacent leaf sections herein indicated. By reason of this frictional condition it is manifest that a great degree of the shock is absorbed by the leaf sections of the hanger spring before transmitting any continuing latent shock that might be present to the hangers 16 thereby, as herein stated, relieving these hangers of undue strain which would otherwise tend to rupture them from association with the chassis.

By pointing the end portion of the leaf section 19 any dirt or other foreign particles of matter which accumulates in the space 29' defined by spacing the adjacent ends of the leaf sections in spaced relation, will be ejected from this space upon relative movement of the leaf section 20. This is due to the fact that the leaf section 20 moves the dirt toward the pointed end of the leaf section 19 and this pointed end guides the dirt from within the space 29'.

The movable leaf section 20 can be, after assembly, lubricated by injecting a lubrication fluid into the space 29', it being apparent that as this leaf section 20 moves relatively to the leaf section 19 that it will come into contact with the lubrication and carry the same back over portions which it moves. It is also pointed out that if desired the ordinary leather boot (not shown) can be arranged to protect the leaf springs from dirt or other foreign particles of matter, it being pointed out that this boot is not disclosed nor described because it does not constitute an essential part of the present invention.

From the description herein it will be manifest that I provide a spring which will perform its necessary respective function and that by the novel construction of the same the spring can be expeditiously connected directly to integral hangers included as a part of the chassis of a vehicle thus producing a spring which can be economically manufactured.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A spring of the class described including reinforcing spring leaves, a hanger spring leaf carrying the reinforcing spring leaves, said hanger spring leaf comprising sectional parts disposed between certain of the reinforcing leaves, one of said sectional parts being free to move relatively to the other of the sectional parts, and a connecting element binding the other of the sectional parts and the reinforcing spring leaves together.

2. A spring of the class described including reinforcing spring leaves, a hanger spring leaf carrying the reinforcing spring leaves, said hanger spring leaf comprising sectional parts disposed between certain of the reinforcing leaves, one of said sectional parts being free to move relatively of the other of the sectional parts, the opposite end portions of the hanger spring leaf being curled to provide bearing sleeves, and a connecting element binding the other of the sectional parts and the reinforcing spring leaves together.

3. The combination with a chassis of a vehicle and hangers associated therewith and an axle, of reinforcing spring leaves, a main hanger spring leaf having opposite ends curled for connection with the hangers, the main hanger spring leaf comprising sectional parts disposed in alignment between certain of the reinforcing spring leaves with adjacent end portions in spaced relation, the end portion of one of the sections of the main hanger spring leaf being pointed in a direction toward the adjacent end of the other of the sections of the main hanger spring leaf, and means for securing the reinforcing spring leaves and the main hanger spring leaf in superposed relation to the axle.

4. The combination with a chassis of a vehicle and hangers associated therewith and an axle, of reinforcing spring leaves, a main hanger spring leaf having opposite ends curled for connection with the hangers, the main hanger spring leaf comprising sectional parts disposed in alignment between certain of the reinforcing spring leaves with adjacent end portions in spaced relation, the end portion of one of the sections of the main hanger spring leaf being pointed in a direction toward the adjacent end of the other of the sections of the main hanger spring leaf, means for securing the reinforcing spring leaves and the main hanger leaf spring in superposed relation to the axle, and a connecting element passing through aligned openings formed in the reinforcing spring leaves and said one of the sections of the main hanger spring leaf for binding said reinforcing spring leaves and the sections of the main hanger spring leaf in said superposed relation.

5. A spring of the class described including an intermediate hanger spring leaf comprising sectional parts disposed in alignment with adjacent end portions in spaced relation with respect to each other, the end portion of one of said sections being pointed in a direction toward the other of the sections.

6. The combination with a chassis of a vehicle, and hangers associated with the chassis, of a spring assembly, said spring assembly including a spring leaf defined by sectional parts having out end portions connected to the hangers, one of said sectional parts being capable of movement toward the other of the sectional parts, and a member connecting the other of the sectional parts to the other spring leaves of the spring assembly.

In testimony whereof I affix my signature.

FRANK C. SHEPLEY.